US012726125B2

(12) United States Patent
Dai et al.

(10) Patent No.: US 12,726,125 B2
(45) Date of Patent: Sep. 1, 2026

(54) VOLTAGE REGULATOR MODE OPERATIONS

(71) Applicant: Hewlett-Packard Development Company, L.P., Spring, TX (US)

(72) Inventors: Fangyong Dai, Spring, TX (US); Qijun Steve Chen, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 207 days.

(21) Appl. No.: 18/528,406

(22) Filed: Dec. 4, 2023

(65) Prior Publication Data

US 2025/0183801 A1 Jun. 5, 2025

(51) Int. Cl.

*H02M 3/158* (2006.01)
*H02M 1/00* (2006.01)
*H02M 1/088* (2006.01)

(52) U.S. Cl.

CPC ....... *H02M 3/1584* (2013.01); *H02M 1/0009* (2021.05); *H02M 1/088* (2013.01)

(58) Field of Classification Search

CPC .... H02M 3/1582; H02M 3/156; H02M 3/157; H02M 3/158; H02M 3/1584; H02M 3/1586; H02M 3/285; H02M 3/33561; H02M 7/49; H02M 1/045; H02M 7/006; H02M 7/06; H02M 7/068; H02M 7/153; H02M 7/10; H02M 1/083; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/0095; H02M 1/08; H02M 1/088; H02M 3/1588; H02M 7/5395; H02M 1/14; H02M 1/0043; H02M 1/0074; H02M 1/0077; H02M 1/0045; H02M 1/0006; H02J 3/46; H02J 3/38

See application file for complete search history.

(56) References Cited

U.S. PATENT DOCUMENTS 10,095,254 B2 * 10/2018 Saavedra .................. G06F 1/26
10,608,539 B1 * 3/2020 Huang .................... H02J 1/102
(Continued)

FOREIGN PATENT DOCUMENTS

JP 2012-155708 A 8/2012

*Primary Examiner* — Jeffrey A Gblende
(74) *Attorney, Agent, or Firm* — Quarles & Brady LLP

(57) ABSTRACT

In an example, a computing device includes a voltage regulator having a voltage regulator controller, a first power stage circuit, and a second power stage circuit. When a control signal indicates that the voltage regulator is to operate in a single-phase mode, the first power stage circuit supplies a first current to a hardware processor and the second power stage circuit does not supply a second current to the hardware processor, where a maximum output current of the first power stage circuit is lower than a maximum output current of the second power stage circuit. When the control signal indicates that the voltage regulator is to operate in a multi-phase mode, the first power stage circuit supplies the first current and the second power stage circuit supplies the second current to the hardware processor.

14 Claims, 4 Drawing Sheets

(56) References Cited

U.S. PATENT DOCUMENTS

| | | | | |
|---|---|---|---|---|
| 11,381,173 | B2 * | 7/2022 | Chen | H02M 1/08 |
| 11,552,471 | B2 * | 1/2023 | Takemoto | H02J 1/102 |
| 2007/0262759 | A1 | 11/2007 | Burton et al. | |
| 2008/0238390 | A1 | 10/2008 | Trivedi et al. | |
| 2010/0164477 | A1 | 7/2010 | Trivedi et al. | |
| 2012/0086418 | A1 * | 4/2012 | Lee | H02M 3/1584<br>323/272 |
| 2012/0187927 | A1 | 7/2012 | Yu et al. | |
| 2016/0048188 | A1 | 2/2016 | Kim | |
| 2021/0382511 | A1 * | 12/2021 | Kim | H02M 3/158 |

* cited by examiner

SENSING CIRCUITS 180

SENSING CIRCUIT 180A

SENSING CIRCUIT 180B

. . .

SENSING CIRCUIT 180N

208

POWER STAGE CIRCUIT 140A

204A

206A

VOLTAGE REGULATOR CONTROLLER 120

204B

POWER STAGE CIRCUIT 140B

206B

TO PROCESSOR 160

204N

POWER STAGE CIRCUIT 140N

206N

202

FROM PROCESSOR 160

VOLTAGE REGULATOR MODE OPERATIONS

BACKGROUND

A computing device refers to a combination of hardware components such as processors and memory devices to carry out some functions. For example, a computing device can present information to a user or allow a user to manipulate information. Some computing devices utilize voltage regulators to regulate power provision.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

In some examples, the techniques described herein relate to a computing device including: a voltage regulator to control a current supplied to a hardware processor, the voltage regulator including: a voltage regulator controller to generate, based on a current supply request of the hardware processor, a control signal to control a plurality of power stage circuits, wherein the control signal indicates whether the voltage regulator is to operate in a single-phase mode or a multi-phase mode; the plurality of power stage circuits including a first power stage circuit and a second power stage circuit, wherein a maximum output current of the first power stage circuit is lower than a maximum output current of the second power stage circuit, and wherein: the first power stage circuit is to supply a first current to the hardware processor and the second power stage circuit is to not supply a second current to the hardware processor when the control signal indicates that the voltage regulator is to operate in the single-phase mode; and the first power stage circuit is to supply the first current to the hardware processor and the second power stage circuit is to supply the second current to the hardware processor when the control signal indicates that the voltage regulator is to operate in the multi-phase mode; and the hardware processor to receive the first current, the second current, or the first current and the second current in response to the current supply request.

In some examples, the techniques described herein relate to a computing device, wherein when the control signal indicates that the voltage regulator is to operate in the multi-phase mode, the voltage regulator controller is to control the first current and the second current based on an amplified signal and a current sense signal.

In some examples, the techniques described herein relate to a computing device, wherein the voltage regulator further includes: a first sensing circuit to sense the first current to generate the amplified signal; and a second sensing circuit to sense the second current to generate the current sense signal.

In some examples, the techniques described herein relate to a computing device, wherein the first sensing circuit includes a resistor and an amplifier, and wherein to generate the amplified signal: the resistor is to generate a voltage signal based on the first current; and the amplifier is to amplify the voltage signal by a particular gain to overstate the first current to the voltage regulator controller.

In some examples, the techniques described herein relate to a computing device, wherein the second sensing circuit does not overstate the second current to the voltage regulator controller.

In some examples, the techniques described herein relate to a computing device, wherein the voltage regulator is to adjust the particular gain based on a ratio between the maximum output current of the first power stage circuit and the maximum output current of the second power stage circuit.

In some examples, the techniques described herein relate to a computing device, wherein the voltage regulator is to set the particular gain through an Inter-Integrated Circuit (I2C) or an Improved Inter-Integrated Circuit (I3C).

In some examples, the techniques described herein relate to a computing device, wherein when the current supply request indicates that a requested current of the hardware processor does not exceed a threshold current, the voltage regulator controller is to generate the control signal to indicate that the voltage regulator is to operate in the single-phase mode.

In some examples, the techniques described herein relate to a computing device, wherein when the current supply request indicates that the requested current of the hardware processor exceeds the threshold current, the voltage regulator controller is to generate the control signal to indicate that the voltage regulator is to operate in the multi-phase mode.

In some examples, the techniques described herein relate to a computing device, wherein the threshold current is adjustable by the voltage regulator or a user of the computing device.

In some examples, the techniques described herein relate to a computing device, wherein the first power stage circuit includes a first inductor, a first power metal-oxide semiconductor field-effect transistor (MOSFET) and a second power MOSFET, and wherein the second power stage circuit includes a second inductor, a third power MOSFET and a fourth power MOSFET.

In some examples, the techniques described herein relate to a computing device, wherein an inductance of the first inductor is higher than an inductance of the second inductor, and wherein a size of the first power MOSFET is smaller than a size of the third power MOSFET.

In some examples, the techniques described herein relate to a computing device, wherein a power conversion efficiency of the first power stage circuit is higher than a power conversion efficiency of the second power stage circuit.

In some examples, the techniques described herein relate to a computing device including: a voltage regulator to control a current supplied to a hardware processor, the voltage regulator including: a voltage regulator controller to generate, based on a current supply request of the hardware processor, a control signal to control a plurality of power stage circuits, wherein the control signal indicates whether the voltage regulator is to operate in a single-phase mode or a multi-phase mode; the plurality of power stage circuits including a first power stage circuit and a second power stage circuit, wherein a maximum output current of the first power stage circuit is lower than a maximum output current of the second power stage circuit, and wherein: the first power stage circuit is to supply a first current to the hardware processor and the second power stage circuit is to not supply a second current to the hardware processor when the control signal indicates that a power consumption of the computing device is at a first level; and the first power stage circuit is to supply the first current to the hardware processor and the second power stage circuit is to supply the second current to the hardware processor when the control signal indicates that the power consumption is at a second level higher than the first level.

In some examples, the techniques described herein relate to a computing device, wherein when the control signal indicates that the power consumption is at the second level higher than the first level, the voltage regulator controller is to control the first current and the second current based on an amplified signal and a current sense signal.

In some examples, the techniques described herein relate to a computing device, wherein the voltage regulator further includes: a first sensing circuit to sense the first current to generate the amplified signal; and a second sensing circuit to sense the second current to generate the current sense signal.

In some examples, the techniques described herein relate to a computing device, wherein the first sensing circuit includes a resistor and an amplifier, and wherein to generate the amplified signal: the resistor is to generate a voltage signal based on the first current; and the amplifier is to amplify the voltage signal by a particular gain to overstate the first current to the voltage regulator controller.

In some examples, the techniques described herein relate to a method for controlling a current supplied to a hardware processor of a computing device, the method including: by a voltage regulator of the computing device that operates in one of a single-phase mode or a multi-phase mode, generating, based on a first current supply request of the hardware processor, a first control signal to control a plurality of power stage circuits, wherein the first control signal indicates that the voltage regulator is to operate in the single-phase mode; supplying a first current to the hardware processor through a first power stage circuit without supplying a second current to the hardware processor through a second power stage circuit based on the first current supply request; generating, based on a second current supply request of the hardware processor, a second control signal, wherein the second control signal indicates that the voltage regulator is to operate in the multi-phase mode, wherein the second current supply request indicates a higher current supply than the first current supply request; and supplying the first current to the hardware processor through the first power stage circuit and the second current to the hardware processor through the second power stage circuit based on the second current supply request, wherein the plurality of power stage circuits includes the first power stage circuit and the second power stage circuit, and wherein a maximum output current of the first power stage circuit is lower than a maximum output current of the second power stage circuit.

In some examples, the techniques described herein relate to a method, further including: controlling the first current and the second current based on an amplified signal and a current sense signal based on the second current supply request.

In some examples, the techniques described herein relate to a method, further including: generating the amplified signal to overstate the first current; and generating the current sense signal without overstating the second current.

BRIEF DESCRIPTION OF THE DRAWINGS

Throughout the drawings, reference numbers are re-used to indicate correspondence between referenced elements. The drawings are provided to illustrate examples of the subject matter described herein and not to limit the scope thereof.

DETAILED DESCRIPTION

Figure 1:
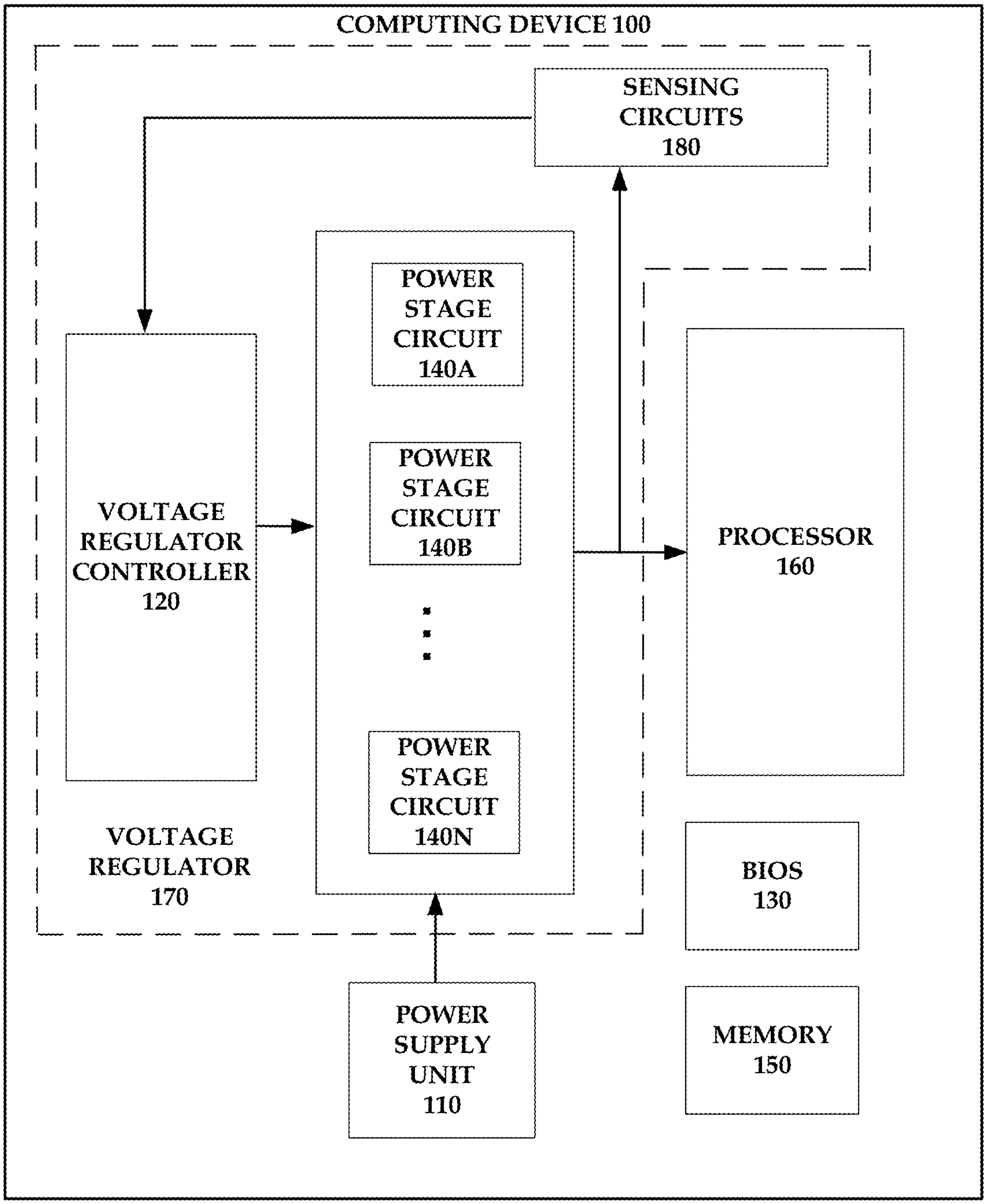
FIG. 1 illustrates a block diagram of an example computing device in which examples of the present disclosure may be implemented.

Some computing systems utilize voltage regulators to supply power to processors. For example, a voltage regulator may manage current supplied to a central processing unit (CPU) to respond to dynamic current loads of the CPU. When the CPU operates under light loads (e.g., supporting webpage browsing, audio recording, or the like), the voltage regulator may reduce current supplied to the CPU. When the CPU operates under heavy loads (e.g., processing compute-intensive applications such as video or graphics rendering), the voltage regulator may increase current supplied to the CPU.

To meet a current supported or requested by a CPU, a voltage regulator may include multiple power stage circuits to jointly supply a current to the CPU. Each of the power stage circuits may regulate power received from a power source to supply the current requested by the CPU. Typically, based on a current supported or requested by the CPU, each of the power stage circuits is designed to be homogeneous or identical (e.g., same architecture and area). As such, a maximum output current of each power stage circuit may be the same and each power stage circuit may supply the same current to the CPU. For example, a voltage regulator may control three power stage circuits to supply a maximum current of 105 A requested by a CPU. Each of the three power stage circuits may supply 35 A to the CPU.

However, in some cases, a CPU may not usually operate under heavy loads to request a maximum current. In real world applications, a CPU may rarely draw maximum current and operate under light loads during most of its operation time. When a CPU operates under light loads, it may be possible for the CPU to draw a smaller current (e.g., 5 A). Under such circumstances, the operation of the voltage regulator may be inefficient because, for example, each of the power stage circuits is designed based on sizing and components (e.g., heavy-duty components) optimized for meeting the maximum supported or requested current of the CPU. The inferior power conversion efficiency of power stage circuits under light loads may lead to shorter battery life or poor user experience.

As such, it may be desirable to implement a voltage regulator that can handle maximum supported or requested current of a processor while improving power efficiency of a computing device when the processor operates under light loads. Some examples of the present disclosure improve power efficiency of a computing device by utilizing heterogeneous power stage circuits that support different current maximums to supply a current to a processor. For example, a power stage circuit that has a power conversion efficiency higher than a power conversion efficiency of another power stage circuit may be employed for providing a current to the processor when the processor operates under light loads. The power stage circuit may have higher power conversion efficiency because of being optimized for meeting lower requested current through using smaller or light-duty components.

In some examples, a voltage regulator controller of the voltage regulator may generate, based on a current supply request from a processor, a control signal to control a plurality of power stage circuits of the voltage regulator. The control signal may indicate whether the voltage regulator is to operate in a single-phase mode that may correspond to the processor operating under light loads or a multi-phase mode that may correspond to the processor operating under heavy loads. The plurality of power stage circuits may include a first power stage circuit and a second power stage circuit. A maximum output current of the first power stage circuit is lower than a maximum output current of the second power stage circuit. When the control signal indicates that the voltage regulator is to operate in the single-phase mode, the first power stage circuit is to supply a first current to the processor and the second power stage circuit is to not supply a second current to the processor. When the control signal indicates that the voltage regulator is to operate in the multi-phase mode, the first power stage circuit is to supply the first current to the processor and the second power stage circuit is to supply the second current to the processor. Advantageously, by utilizing the first power stage circuit that has a power conversion efficiency higher than a power conversion efficiency of the second power stage circuit to supply current to the processor, the voltage regulator may be more power efficient when the processor operates under light loads compared to voltage regulators that use homogenous power stage circuits.

In some examples, when the control signal indicates that the voltage regulator is to operate in the multi-phase mode, the voltage regulator controller is to attempt to balance the first current and the second current based on an amplified signal and a current sense signal. For example, the first current and the second current may be controlled by the voltage regulator controller to be 5 A and 55 A, respectively. The amplified signal may be generated by a first sensing circuit by sensing and amplifying the first current supplied to the processor from the first power stage circuit, and the current sense signal may be generated by a second sensing circuit by sensing the second current supplied to the processor from the second power stage circuit. More specifically, the first sensing circuit may include a resister and an amplifier. The resistor may generate a voltage signal based on the first current, and the amplifier may amplify the voltage signal by a particular gain to generate the amplified signal that overstates the first current to the voltage regulator controller that attempts to balance the first current and the second current. Advantageously, attempting to balance the first current and the second current based on an overstatement of the first current prevents the first power stage circuit from supplying current above its maximum output current. Further, changes to existing design of a voltage regulator for managing power provision to a processor may be minimal because the voltage regulator controller perceives each of the power stage circuits supplying the same amount of power to the processor despite some of the power stage circuits supplies less amount of power compared to remaining of the power stage circuits.

In some examples, the disclosed examples may be implemented in hardware, firmware, software, or any combination thereof. The disclosed examples may be implemented as instructions stored in a transitory or non-transitory computer-readable storage medium, which may be read and executed by a processor core or thread. Further, the instructions may be updated and/or obtained from a remote server via a network connection.

Example Computing Device

FIG. 1 illustrates a block diagram of an example computing device 100 in which examples of the present disclosure may be implemented. Examples of the computing device 100 may include, but not limited to, laptops, desktops, tablets, wearable computers, smartphones, and personal digital assistants (PDA), hybrid PDA/mobile phone, set-top box, voice command device, and digital media player. In some examples, the computing device 100 includes a processor 160, a basic input/output system (BIOS) 130, a memory 150, a power supply unit 110, and a voltage regulator 170. The voltage regulator 170 includes a voltage regulator controller 120, sensing circuits 180, and power stage circuits 140A through 140N. As illustrated in FIG. 1, the voltage regulator controller 120, sensing circuit 180, and the power stage circuits 140A through 140N may communicate with each other to supply power from the power supply unit 110 to the processor 160. Though not illustrated in FIG. 1, in some examples, the voltage regulator 170 (e.g., the voltage regulator controller 120, the sensing circuits, the power stage circuits 140A through 140N), and the processor 160 can be deployed on a mainboard/motherboard of the computing device 100.

In some examples, the voltage regulator controller 120, the sensing circuits 180, and the power stage circuits 140A through 140N may be part of the voltage regulator 170 of the computing device 100. The voltage regulator controller 120 may be implemented using any combination of hardware, firmware, and software to control the power stage circuits 140A through 140N to supply current to the processor 160. In some examples, the voltage regulator controller 120 may be a part of a system-on-a-chip and can be deployed along with the sensing circuits 180, the power stage circuits 140A through 140N, and other components (not shown in FIG. 1) of the computing device 100 on a single or multiple integrated circuits or chipsets.

Each of the power stage circuits 140A through 140N may be implemented using circuitry that regulates power received from the power supply unit 110 to a current for supplying to the processor 160. The sensing circuits 180 may be implemented using various circuit components (e.g., a resistor, a transistor, or an amplifier) to sense a current provided to the processor 160 by the power stage circuits 140A through 140N, and provide sensed current to the voltage regulator controller 120 for managing or balancing current supplied by each of the power stage circuits 140A through 140N. Example architecture of the sensing circuits 180 and the power stage circuits 140A through 140N will be described in greater detail below.

During operation, the voltage regulator controller 120 may generate, based on a current supply request from the processor 160, a control signal (not shown in FIG. 1) to control the power stage circuits 140A through 140N. The control signal may indicate whether the voltage regulator controller 120, the power stage circuits 140A through 140N, and the sensing circuits 180 are to operate in a single-phase mode or a multi-phase mode. In some examples, the power stage circuit 140A has a maximum output current lower than a maximum output current of any of the power stage circuits 140B through 140N, indicating that the power stage circuit 140A may have a higher power efficiency for supplying current to the processor 160 when the processor 160 operates under light loads.

In some examples, when the control signal indicates that the voltage regulator 170 is to operate in the single-phase mode (e.g., current request of the processor 160 can be satisfied by the power stage circuit 140A), the power stage circuit 140A may be configured to supply a current to the processor 160 and the remaining power stage circuits 140B through 140N may be configured to not supply a current to the processor 160. When the control signal indicates that the voltage regulator 170 is to operate in the multi-phase mode (e.g., current request of the processor 160 cannot be satisfied by the power stage circuit 140A), two or more of the power stage circuits 140A through 140N may be configured to supply a current to the processor 160. In some cases, the multi-phase mode may cause all of the power stage circuits 140A-140N to supply a current. Advantageously, by utilizing solely the power stage circuit 140A to provide current, power efficiency can be improved because, for example, the power stage circuit 140A may be implemented using components that that have a higher power conversion efficiency than the power stage circuits 140B through 140N. Further, because the power stage circuit 140A may be limited to a lower maximum current than the remaining power stage circuits 140B-140N, power savings can be achieved and battery life can be extended in circumstances where the processor 160 can operate using less than a threshold current (e.g., less than 5 amps).

In some examples, when the control signal indicates that the voltage regulator 170 is to operate in the multi-phase mode (e.g., current request of the processor 160 can be satisfied by the power stage circuit 140A), the voltage regulator controller 120 may be configured to attempt to balance currents supplied by two or more of the power stage circuits 140A through 140N using current control signals. For example, the power stage circuit 140A may supply a first current (e.g., 10 A) to the processor 160 and the power stage circuit 140B may supply a second current (e.g., 80 A) to the processor 160. The sensing circuits 180 may sense the first current to generate a current amplified signal, and sense the second current to generate a current sense signal. The current amplified signal and the current sense signal may be used by the voltage regulator controller 120 to attempt to balance the first current and the second current. In some examples, the sensing circuits 180 may overstate the first current to the voltage regulator controller 120 through the amplified current signal without overstating the second current to the voltage regulator controller 120. As such, the first current may be controlled by the voltage regulator controller 120 to maintain at a level lower than the second current supplied by the power stage circuit 140B to the processor 160. Advantageously, the power stage circuit 140A may be prevented from being overwhelmed.

In some examples, the processor 160 may be embodied as any type of multi-core or multi-thread processor capable of performing functions as described herein. The processor 160 may be embodied as a hardware processor, a microprocessor, central processing unit (CPU), digital signal processor, microcontroller, a graphics processing unit (GPU), or other processor or processing/controlling circuit. Although not illustrated in FIG. 1, the processor 160 can communicate with the voltage regulator controller 120 to request a current from the power stage circuits 140A through 140N based on loads of the processor 160. Further, the processor 160 may directly (not shown in FIG. 1) or indirectly communicate with the memory 150 and the BIOS 130 to access data and instructions stored in the memory 150 and the BIOS 130 to perform various functions.

In some examples, the memory 150 may be embodied as any type of volatile or non-volatile memory or data storage, such as dynamic random access memory (DRAM), static random access memory (SRAM), synchronous DRAM (SDRAM), double data rate synchronous dynamic random access memory (DDR SDRAM). The memory 150 may store various data and program code used during operation of the computing device 100, including operating systems, application programs, libraries, driver, and the like. As indicated above, the memory 150 may be communicatively coupled to the processor 160 through bus interfaces (not shown in FIG. 1).

In some examples, a basic input/output system (BIOS) 130 refers to hardware or hardware and instructions to initialize, control, or operate a computing device prior to execution of an operating system (OS) of the computing device 100. Instructions included within the BIOS 130 may be software, firmware, microcode, or other programming that defines or controls functionality or operation of the BIOS 130. In some examples, the BIOS 130 may be implemented using instructions, such as platform firmware of a computing device, executable by a processor. The BIOS 130 may operate or execute prior to the execution of the OS of the computing device 100. The BIOS 130 may initialize, control, or operate components such as hardware components of a computing device and may load or boot the OS of the computing device 100. In some examples, the BIOS 130 may provide or establish an interface between hardware devices or platform firmware of the computing device and OS of the computing device 100, via which the OS of the computing device 100 may control or operate hardware devices or platform firmware of the computing device 100. In some examples, the BIOS 130 may implement the Unified Extensible Firmware Interface (UEFI) specification or another specification or standard for initializing, controlling, or operating a computing device 100.

In some examples, the power supply unit 110 may receive an alternating current (AC) power source and generate supply voltage(s) for one or more components (e.g., the power stage circuits 140A through 140N and the voltage regulator controller 120) of the computing device 100. The power supply unit 110 may be attached to a chassis (not shown) of the computing device 100. In some examples, the power supply unit 110 may be compatible with the ATX specification (e.g., the ATX 1.0, the ATX 2.0, or the ATX 3.0). The power supply unit 110 may supply power to the processor 160 via the power stage circuits 140A through 140N.

Example Voltage Regulator

Figure 2:
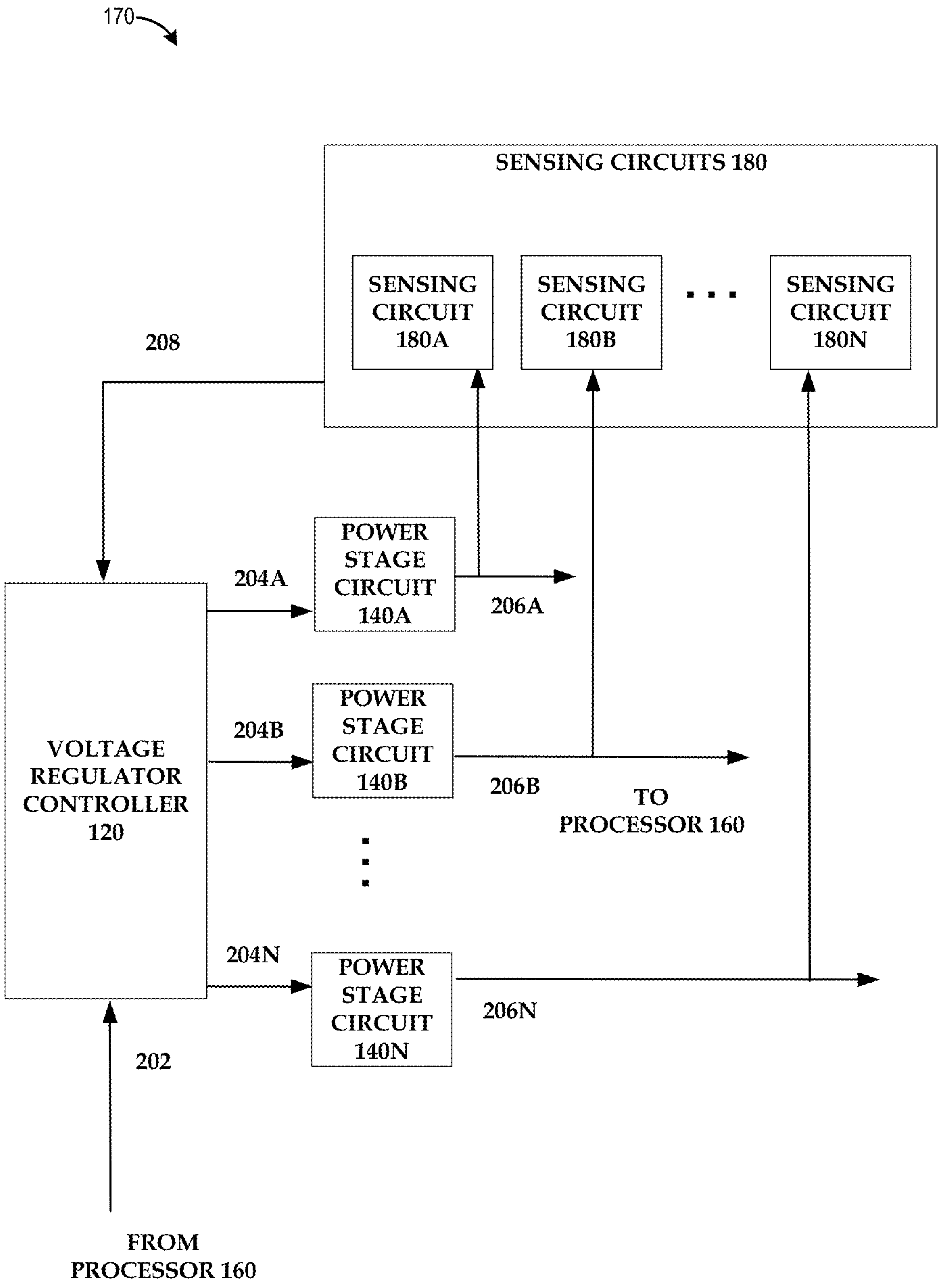
FIG. 2 illustrates an example block diagram of a voltage regulator utilized to manage current supplied to a processor of the computing device of FIG. 1 in accordance with some examples of the present disclosure.

FIG. 2 illustrates an example block diagram of the voltage regulator 170. The voltage regulator 170 may include the voltage regulator controller 120, the power stage circuits 140A through 140N, and the sensing circuits 180 that can be utilized to manage current supplied to the processor 160 of the computing device 100 in accordance with some examples of the present disclosure.

As illustrated in FIG. 2, the voltage regulator controller 120 receives a current supply request 202 from the processor 160. Based on the current supply request 202, the voltage regulator controller 120 generates the control signals 204A through 204N to control the power stage circuits 140A through 140N, respectively. Based on the control signals 204A through 204N, the power stage circuits 140A through 140N may supply the current 206A through 206N to the processor 160, respectively. The total amount of current received by the processor 160 may be the summation of the current 206A through 206N.

In some examples, the voltage regulator controller 120 may attempt to balance the currents 206A through 206N supplied by the power stage circuits 140A through 140N when the voltage regulator controller 120 and the power stage circuits 140A through 140N operate under the multi-phase mode. For example, based on an overstatement of the current 206A, the voltage regulator controller 120 may perceive that the current 206A and the current 206B are balanced (e.g., the same with each other) despite the current 206A being less than the current 206B due to a lower maximum supported current of the power stage circuit 140A. This perception may be based on receiving a signal that is an amplified version of the current 206A rather than a measure of the current 206A itself. In some examples, the voltage regulator 170 may employ an amplifier that amplifies the current 206A to provide an amplified current for overstating the current 206A to the voltage regulator controller 120 without overstating the current 206B to the voltage regulator controller 120. As such, the voltage regulator controller 120 may make a determination that the current 206A and the current 206B are balanced despite the current 206A being less than the current 206B.

In some examples, in addition to causing the current 206A to be less than the current 206B while perceiving that the current 206A is balanced with the current 206B, the voltage regulator controller 120 may balance the currents 206B through 206N, thereby causing each of the currents 206B through 206N to be the same or within a threshold difference of each other. The threshold difference may account for tolerance due to, for example, matching differences, manufacturing tolerances, component imperfections, or the like among the power stage circuits 140B through 140N. As such, the currents 206B through 206N may be the same or similar to each other within the threshold difference.

In some examples, to attempt to balance the currents 206A through 206N, the sensing circuits 180A through 180N may sense the currents 206A through 206N, respectively, to generate current control signals 208 that will be used by the voltage regulator controller 120 to maintain the currents 206A through 206N at a desired level. For example, assuming the power stage circuit 140A is designed with smaller size and light-duty components, the voltage regulator controller 120 may control the currents 206A through 206N such that the current 206A is less than each of the currents 206B through 206N. As such, the power stage circuits 140A through 140N may meet the current request of the processor 160 without overwhelming the power stage circuit 140A. Further, the power stage circuits 140A through 140N may achieve improved power efficiency by supplying a current to the processor 160 solely through the power stage circuit 140A while the processor 160 is operating under light loads. Under light loads (e.g., streaming video or reviewing a text document), current requested by the processor 160 may be less than a threshold current (e.g., 5 A, 10 A, or the like).

Example Circuit Design of Voltage Regulator

Figure 3:
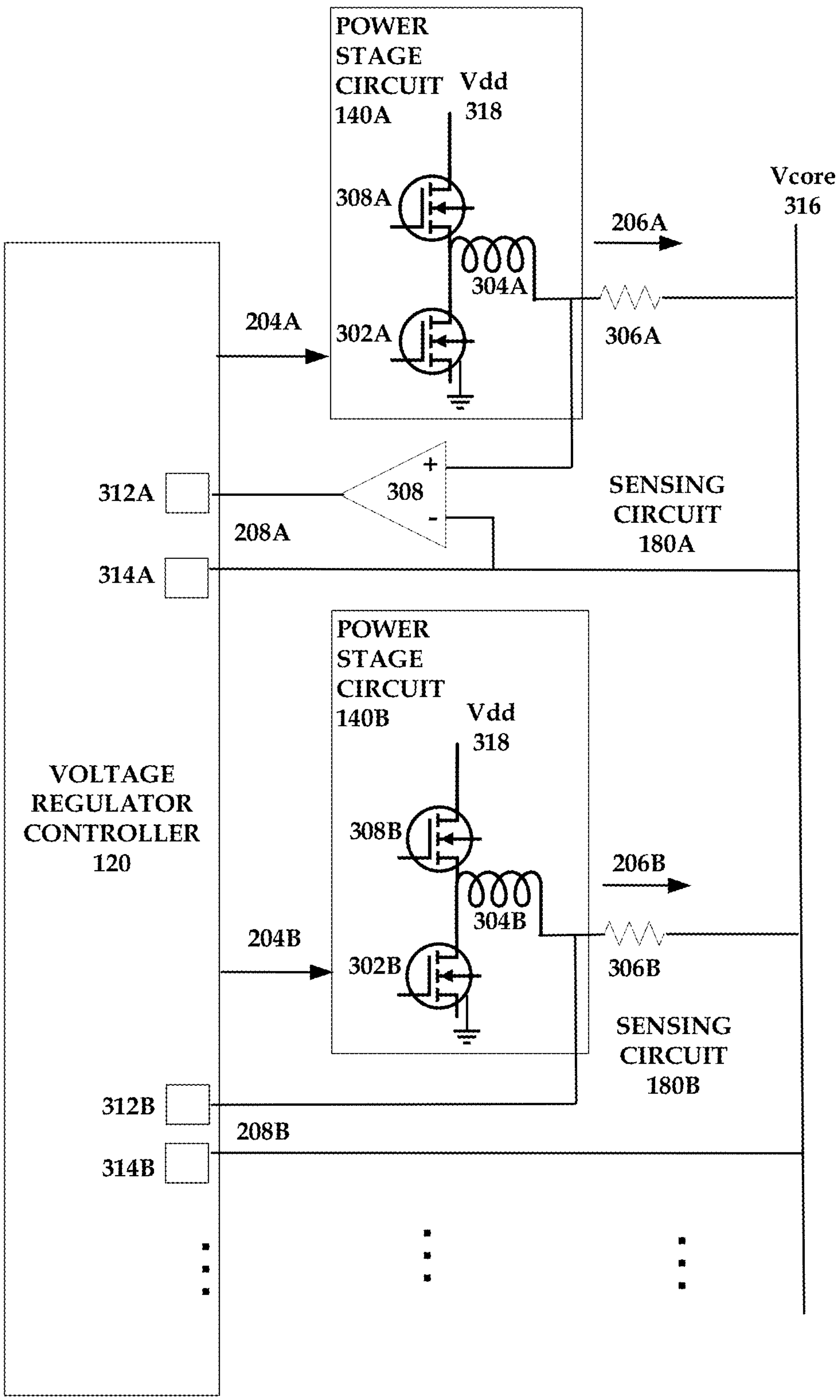
FIG. 3 illustrates a block diagram with additional details of components of the voltage regulator of FIG. 2 and with which current supplied from some of the components may be controlled in accordance with some examples of the present disclosure.

FIG. 3 illustrates a block diagram with additional details of the voltage regulator 170 of FIG. 1 and FIG. 2 with which current supplied from the power stage circuits 140A through 140N may be controlled in accordance with some examples of the present disclosure. As shown in FIG. 3, Vcore 316 may illustrate an operating voltage of the processor 160, and Vdd 318 may illustrate a supply voltage associated with the voltage regulator 170.

As illustrated in FIG. 3, the power stage circuit 140A includes the transistor 302A, the transistor 308A and the inductor 304A, and the power stage circuit 140B includes the transistor 302B, the transistor 308B and the inductor 304B. In some examples, each of the transistors 302A, 308A, 302B, and 308B may be a power metal-oxide semiconductor field-effect transistor (e.g., a power MOSFET). Each of the transistors 302A and 308A may be smaller in size than each of the transistors 302B and 308B. For example, the transistor 302A may be smaller in size than the transistor 302B. Additionally, the inductor 304A may have an inductance that is higher than an inductance of the inductor 304B. As such, the power stage circuit 140A may provide a maximum output current lower than a maximum output current provided by the power stage circuit 140B. Further, when used for supplying current to the processor 160 that is operating under light loads, the power stage circuit 140A may have a power conversion efficiency higher than a power conversion efficiency of the power stage circuit 140B. Although not fully illustrated in FIG. 3, each of the power stage circuit 140A and power stage circuit 140B may receive power from the power supply unit 110 and regulate power received from the power supply unit 110 to supply the current 206A and the current 206B, respectively. The current 206A and the current 206B may be combined to be supplied to the processor 160. In some examples, the inductance of the inductor 304A is 330 nH and the inductance of the inductor 304B is 150 nH.

In some examples, the sensing circuit 180A includes the resistor 306A and the amplifier 308. The sensing circuit 180B includes the resistor 306B. The amplifier 308 may be a differential amplifier or any other types of amplifiers that amplifies signals received at input terminals according to a particular gain. In operation, the resistor 306A generates a voltage signal as the current 206A passes through the resistor 306A. The voltage signal may be received at the two input terminals of the amplifier 308. The amplifier 308 then amplifies the voltage signal generated by the resistor 306A by a particular gain, thereby generating an amplified signal 208A that is received by a pin 312A and a pin 314A of the voltage regulator controller 120. Additionally, the resistor 306B generates a voltage signal as the current 206B passes through the resistor 306B. The voltage signal may be received by a pin 312B and a pin 314B of the voltage regulator controller 120 as the current sense signal 208B.

Based on the amplified signal 208A and the current sense signal 208B, the voltage regulator controller 120 may attempt to balance the current 206A and the current 206B. In some examples, the current 206A and the current 206B may be controlled according to a ratio between a maximum output current of the power stage circuit 140A and a maximum output current of the power stage circuit 140B. For example, assuming the maximum output current of the power stage circuit 140A is 5 A and the maximum output current of the power stage circuit 140B is 55 A, the voltage regulator controller 120 may control the power stage circuit 140A through the control signal 204A and the power stage circuit 140B through the control signal 204B such that the power stage circuit 140A supplies 5 A to the processor 160 and the power stage circuit 140B supplies 55 A to the processor 160. In this example, the particular gain of the amplifier 308 may be set to eleven such that the voltage regulator controller 120 may perceive that the power stage circuit 140A and the power stage circuit 140B both supply the same current (e.g., 55 A) to the processor 160. As such, the voltage regulator controller 120 may not continue adjust the control signal 204A to increase the current 206A toward the current 206B, thereby avoiding the power stage circuit 140A from providing the current 206A beyond the maximum output current of the power stage circuit 140A.

In some examples, the voltage regulator controller 120 may set the particular gain of the amplifier 308 through an Inter-Integrated Circuit (I2C) or an Improved Inter-Integrated Circuit (I3C) based on a ratio between the maximum output current of the power stage circuit 140A and the maximum output current of the power stage circuit 140B.

In some examples, when a control signal generated by the voltage regulator controller 120 indicates that the voltage regulator controller 120 and the power stage circuits 140A through 140N are to operate under a single-phase mode (e.g., the power stage circuit 140A enabled while the power stage circuits 140B through 140N being disabled), the voltage regulator controller 120 may set the particular gain of the amplifier 308 to a unity gain. As such, while operating under the single-phase mode, the voltage regulator controller 120 may track the current 206A supplied to the processor 160 through the power stage circuit 140A.

Example Voltage Regulator Control Process

Figure 4:
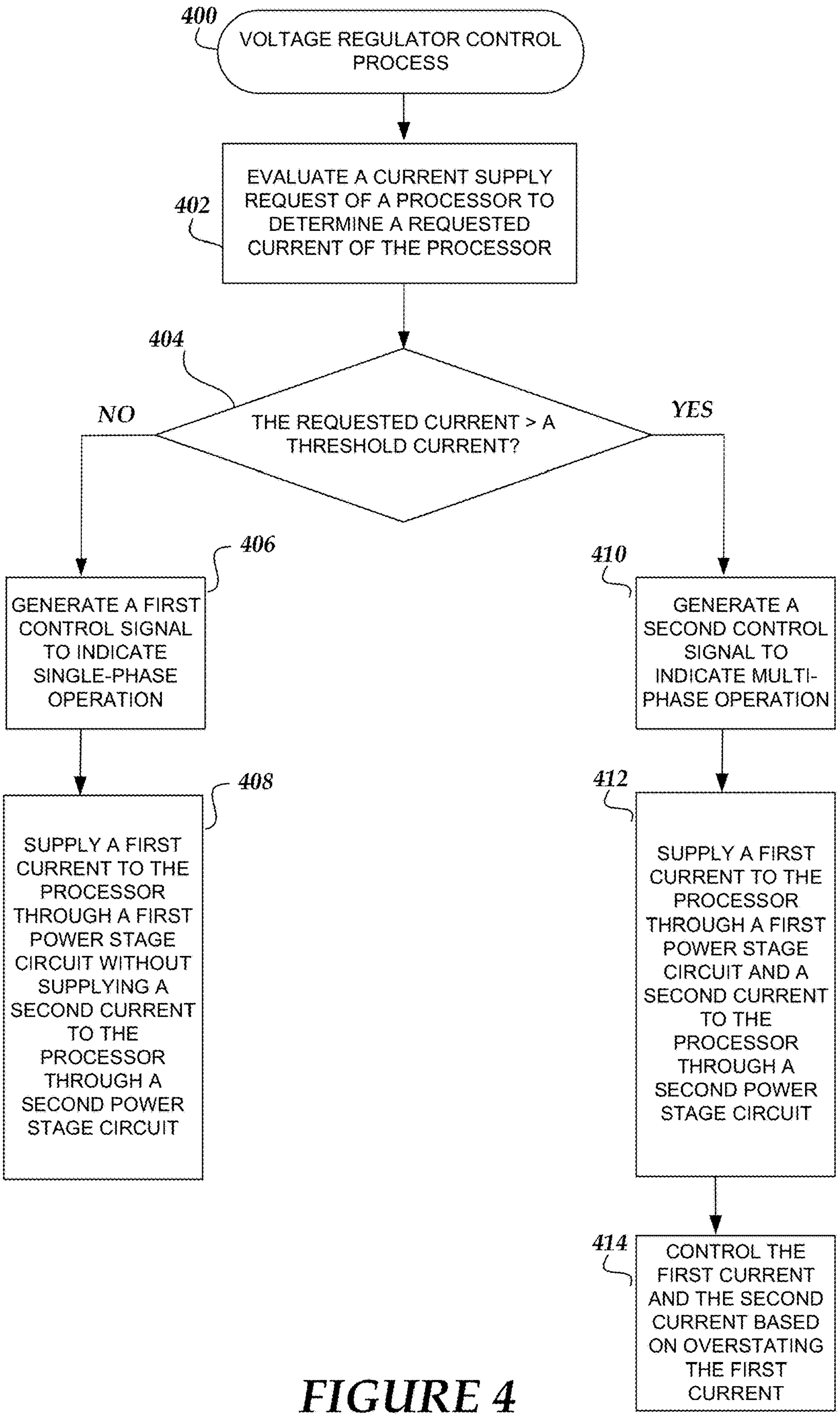
FIG. 4 depicts a flowchart of an example voltage regulator control process in accordance with some examples of the present disclosure.

With reference to FIG. 4, an illustrative voltage regulator control process 400 (or simply referred to herein as a process) for improving power efficiency of a computing device under light loads will be described. The process 400 may be implemented, for example, by the voltage regulator controller 120 and the power stage circuits 140A through 140N.

The process begins at block 402. At block 402, the voltage regulator controller 120 evaluates a current supply request of the processor 160 to determine a requested current of the processor 160. The current supply request of the processor 160 may indicate the requested current of the processor 160. By evaluating the current supply request of the processor 160, the voltage regulator controller 120 may determine the requested current of the processor 160.

At decision block 404, the voltage regulator controller 120 determines if the requested current of the processor 160 exceeds a threshold current. The process 400 then varies according to whether the requested current of the processor 160 exceeds, or in some cases is equal to, the threshold current, as determined at the decision block 404. If the requested current does not exceed the threshold current, the process 400 proceeds to block 406.

At block 406, the voltage regulator controller 120 generates a first control signal to indicate that the voltage regulator 170 is to operate in a single-phase mode.

At block 408, when operating in the single-phase mode, the voltage regulator 170 may supply a first current to the processor 160 through a first power stage circuit without supplying a second current to the processor 160 through a second power stage circuit. For example, the power stage circuit 140A may supply a first current to the processor 160 while none of the power stage circuits 140B through 140N may supply any current to the processor 160 when the first control signal generated at block 406 indicates that the voltage regulator 170 is to operate in the single-phase mode.

If at decision block 404 it is determined that the requested current exceeds the threshold current (e.g., the processor 160 requests a higher current supply compared with when the requested current does not exceed the threshold current), the process proceeds to block 410.

At block 410, the voltage regulator controller 120 generates a second control signal to indicate that the voltage regulator 170 is to operate in a multi-phase mode.

At block 412, when operating in the multi-phase mode, the voltage regulator 170 may supply a first current to the processor 160 through a first power stage circuit and a second current to the processor 160 through a second power stage circuit. For example, the power stage circuit 140A may supply a first current to the processor 160 while each of the power stage circuits 140B through 140N may supply a second current to the processor 160 when the second control signal generated at block 410 indicates that the voltage regulator 170 is to operate in the multi-phase mode. In this case, the second current will likely be greater than the first current because the maximum current of the power stage circuit 140A is less than the maximum current of the power stage circuits 140B through 40N).

At block 414, the voltage regulator controller 120 controls the first current supplied to the processor 160 through the first power stage circuit and the second current supplied to the processor 160 through the second power stage circuit based on overstating the first current. For example, the voltage regulator controller 120 may control the current 206A supplied to the processor 160 through the power stage circuit 140A and the current 206B supplied to the processor 160 through the power stage circuit 140B by overstating the current 206A rather than the current 206B.

More specifically, the voltage regulator controller 120 may attempt to balance the current 206A and the current 206B based on the amplified signal 208A and the current sense signal 208B. As noted above, based on an overstatement of the current 206A in attempting to balance the current 206A and the current 206B, the voltage regulator controller 120 may perceive or determine that the current 206A and the current 206B are balanced (e.g., the same with each other) despite the current 206A being less than the current 206B due to a lower maximum supported current of the power stage circuit 140A. In some examples, the voltage regulator 170 may employ the amplifier 308 that amplifies the current 206A to generate the amplified signal 208A for overstating the current 206A to the voltage regulator controller 120. As such, the voltage regulator controller 120 may perceive that the current 206A and the current 206B are balanced despite the current 206A being less than the current 206B.

In some examples, in addition to causing the current 206A to be less than the current 206B while perceiving that the current 206A is balanced with the current 206B, the voltage regulator controller 120 may balance the currents 206B through 206N, thereby causing each of the currents 206B through 206N to be the same or within a threshold difference. The threshold difference may account for tolerance due to, for example, matching differences, component imperfections, or the like among the power stage circuits 140B through 140N. As such, the currents 206B through 206N may be the same or similar to each other within the threshold difference.

The amplified signal 208A may be generated by the sensing circuit 180A, and the current sense signal 208B may be generated by the sensing circuit 180B. The sensing circuit 180A may utilize an amplifier (e.g., the amplifier 308) having a particular gain to overstate the current 206A to the voltage regulator controller 120. In contrast, the sensing circuit 180B may not overstate the current 206B to the voltage regulator controller 120. Through the sensing circuit 180A overstating the current 206A to the voltage regulator controller 120, the voltage regulator controller 120 may perceive that the current 206A is the same as the current 206B while in reality the current 206A is less than the current 206B. As such, the current 206A supplied by the power stage circuit 140A to the processor 160 may be controlled by the voltage regulator controller 120 to maintain at a level lower than the current 206B supplied by the power stage circuit 140B to the processor 160. Advantageously, the power stage circuit 140A may be prevented from being overwhelmed.

In some examples, the threshold current utilized at decision block 404 may be adjustable by the voltage regulator controller 120, other components (e.g., the processor 160) of the computing device 100, or a user of the computing device 100. Advantageously, adjusting the threshold current may enable the power stage circuits 140A through 140N to operate under the single-phase mode or the multi-phase mode based on requests of the processor 160. For example, by increasing the threshold current, the power stage circuits 140A through 140N are more likely to operate under the single-phase mode with the power stage circuit 140A that has higher power conversion efficiency under light loads enabled while the power stage circuits 140B through 140N being disabled. As such, power efficiency may be improved under more operating conditions or applications supported by the processor 160.

In some examples, instead of determining if the requested current of the processor 160 exceeds a threshold current at decision block 404, the voltage regulator controller 120 may determine if a power consumption of the processor 160 or the computing device 100 exceeds a threshold power for generating a control signal to indicate whether the voltage regulator 170 is to operate in a single-phase mode or a multi-phase mode. For example, if the power consumption of the processor 160 or the computing device 100 is determined to be at a first level, the voltage regulator controller 120 may generate the control signal to indicate the voltage regulator 170 is to operate in the single-phase mode. If the power consumption of the processor 160 or the computing device 100 is determined to be at a second level higher than the first level, the voltage regulator controller 120 may generate the control signal to indicate the voltage regulator 170 is to operate in the multi-phase mode.

As will be appreciated by one of skill in the art in light of the present disclosure, certain examples disclosed herein improve the ability of computing devices, such as voltage regulators for supplying currents to processors with higher power efficiency. Specifically, the presently disclosed examples address technical problems inherent within computing systems: inferior power conversion efficiency while operating under light loads. These technical problems are addressed by the various technical solutions described herein, including the use of a voltage regulator controller to generate a control signal to control a plurality of power stage circuits to supply a current to a process through a first power stage circuit rather than a second power stage circuit when the control signal indicates that a voltage regulator is to operate under a single-phase mode with the first power stage circuit having a maximum output current lower than a maximum output current of the second power stage circuit. Thus, the present disclosure represents an improvement in computing systems.

It should be noted that the description and the figures above merely illustrate the principles of the present subject matter along with examples described herein and should not be construed as a limitation to the present subject matter. It is thus understood that various arrangements may be devised that although not explicitly described or shown herein, embody the principles of the present subject matter. Moreover, all statements herein reciting principles, aspects, and implementations of the present subject matter, as well as specific examples thereof, are intended to encompass equivalents thereof.

Terminology

It is to be understood that not necessarily all objects or advantages may be achieved in accordance with any particular example described herein. Thus, for example, those skilled in the art will recognize that some examples may be operated in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the example, some acts, events, or functions of any of the algorithms described herein can be performed in a different sequence, can be added, merged, or left out altogether (for example, not all described acts or events are necessary for the practice of the algorithms). Moreover, in some examples, acts or events can be performed concurrently, for example, through multi-threaded processing, interrupt processing, or multiple processors or processor cores, or on other parallel architectures, rather than sequentially. In addition, different tasks or processes can be performed by different machines and/or computing systems that can function together.

The various illustrative logical blocks and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combination of the same, or the like. A processor can include electrical circuitry to process computer-executable instructions. In some examples, a processor includes an FPGA or other programmable device that performs logic operations without processing computer-executable instructions. A processor can also be implemented as a combination of computing devices, for example, a combination of a DSP and a microprocessor, a plurality of microprocessors, microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the examples disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some examples, such processes or portions thereof may be implemented on multiple computing devices and/or multiple processors, serially or in parallel.

Conditional language such as, among others, "can," "could," "might" or "may," unless specifically stated otherwise, are otherwise understood within the context as used in general to convey that some examples include, while other examples do not include, some features, elements and/or steps. Thus, such conditional language is not generally intended to imply that features, elements and/or steps are in any way for examples or that examples necessarily include logic for deciding, with or without user input or prompting, whether these features, elements and/or steps are included or are to be performed in any particular example.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that some examples require at least one of X, at least one of Y, or at least one of Z to each be present.

Any process descriptions, elements or blocks in the flow diagrams described herein and/or depicted in the attached figures should be understood as potentially representing modules, segments, or portions of code which include executable instructions for implementing specific logical functions or elements in the process. Alternate examples are included within the scope of the examples described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure.

Any process descriptions, elements or blocks in the flow diagrams described herein and/or depicted in the attached figures should be understood as potentially representing modules, segments, or portions of code which include executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A computing device comprising:

a voltage regulator to control a current supplied to a hardware processor, the voltage regulator comprising:

a voltage regulator controller to generate, based on a current supply request of the hardware processor, a control signal to control a plurality of power stage circuits, wherein the control signal indicates whether the voltage regulator is to operate in a single-phase mode or a multi-phase mode, where in the voltage regulator further comprises:

a first sensing circuit to sense a first current to generate an amplified signal; and a second sensing circuit to sense a second current to generate a current sense signal;

the plurality of power stage circuits comprising a first power stage circuit and a second power stage circuit, wherein a maximum output current of the first power stage circuit is lower than a maximum output current of the second power stage circuit and a power conversion efficiency of the first power stage circuit is higher than a power conversion efficiency of the second power stage circuit, and wherein:

the first power stage circuit is to supply the first current to the hardware processor and the second power stage circuit is to not supply the second current to the hardware processor when the control signal indicates that the voltage regulator is to operate in the single-phase mode; and the first power stage circuit is to supply the first current to the hardware processor and the second power stage circuit is to supply the second current to the hardware processor when the control signal indicates that the voltage regulator is to operate in the multi-phase mode, wherein while in the multi-phase mode, the voltage regulator controller is to control the first current and the second current based on the amplified signal and the current sense signal; and the hardware processor to receive the first current, the second current, or the first current and the second current in response to the current supply request.

2. The computing device of claim 1, wherein the first sensing circuit comprises a resistor and an amplifier, and wherein to generate the amplified signal:

the resistor is to generate a voltage signal based on the first current; and the amplifier is to amplify the voltage signal by a particular gain to overstate the first current to the voltage regulator controller.

3. The computing device of claim 2, wherein the second sensing circuit does not overstate the second current to the voltage regulator controller.

4. The computing device of claim 2, wherein the voltage regulator is to adjust the particular gain based on a ratio between the maximum output current of the first power stage circuit and the maximum output current of the second power stage circuit.

5. The computing device of claim 4, wherein the voltage regulator is to set the particular gain through an Inter-Integrated Circuit (I2C) or an Improved Inter-Integrated Circuit (I3C).

6. The computing device of claim 1, wherein when the current supply request indicates that a requested current of the hardware processor does not exceed a threshold current, the voltage regulator controller is to generate the control signal to indicate that the voltage regulator is to operate in the single-phase mode.

7. The computing device of claim 6, wherein when the current supply request indicates that the requested current of the hardware processor exceeds the threshold current, the voltage regulator controller is to generate the control signal to indicate that the voltage regulator is to operate in the multi-phase mode.

8. The computing device of claim 6, wherein the threshold current is adjustable by the voltage regulator or a user of the computing device.

9. The computing device of claim 1, wherein the first power stage circuit includes a first inductor, a first power metal-oxide semiconductor field-effect transistor (MOSFET) and a second power MOSFET, and wherein the second power stage circuit includes a second inductor, a third power MOSFET and a fourth power MOSFET.

10. The computing device of claim 9, wherein an inductance of the first inductor is higher than an inductance of the second inductor, and wherein a size of the first power MOSFET is smaller than a size of the third power MOSFET.

11. The computing device of claim 1, wherein a power conversion efficiency of the first power stage circuit is higher than a power conversion efficiency of the second power stage circuit.

12. A computing device comprising:

a voltage regulator to control a current supplied to a hardware processor, the voltage regulator comprising:

a voltage regulator controller to generate, based on a current supply request of the hardware processor, a control signal to control a plurality of power stage circuits, wherein the control signal indicates whether the voltage regulator is to operate in a single-phase mode or a multi-phase mode, where in the voltage regulator further comprises:

a first sensing circuit to sense a first current to generate an amplified signal; and a second sensing circuit to sense a second current to generate a current sense signal;

the plurality of power stage circuits comprising a first power stage circuit and a second power stage circuit, wherein a maximum output current of the first power stage circuit is lower than a maximum output current of the second power stage circuit and a power conversion efficiency of the first power stage circuit is higher than a power conversion efficiency of the second power stage circuit, and wherein:

the first power stage circuit is to supply the first current to the hardware processor and the second power stage circuit is to not supply the second current to the hardware processor when the control signal indicates that a power consumption of the computing device is at a first level; and the first power stage circuit is to supply the first current to the hardware processor and the second power stage circuit is to supply the second current to the hardware processor when the control signal indicates that the power consumption is at a second level higher than the first level, wherein when the control signal indicates that the power consumption is at the second level higher than the first level, the voltage regulator controller is to control the first current and the second current based on the amplified signal and the current sense signal.

13. The computing device of claim 12, wherein the first sensing circuit comprises a resistor and an amplifier, and wherein to generate the amplified signal:

the resistor is to generate a voltage signal based on the first current; and the amplifier is to amplify the voltage signal by a particular gain to overstate the first current to the voltage regulator controller.

14. A method for controlling a current supplied to a hardware processor of a computing device, the method comprising:

by a voltage regulator of the computing device that operates in one of a single-phase mode or a multi-phase mode, generating, based on a first current supply request of the hardware processor, a first control signal to control a plurality of power stage circuits, wherein the first control signal indicates that the voltage regulator is to operate in the single-phase mode;

supplying a first current to the hardware processor through a first power stage circuit without supplying a second current to the hardware processor through a second power stage circuit based on the first current supply request;

generating, based on a second current supply request of the hardware processor, a second control signal, wherein the second control signal indicates that the voltage regulator is to operate in the multi-phase mode, wherein the second current supply request indicates a higher current supply than the first current supply request;

supplying the first current to the hardware processor through the first power stage circuit and the second current to the hardware processor through the second power stage circuit based on the second current supply request; and controlling the first current and the second current based on an amplified signal and a current sense signal corresponding to the second current supply request, wherein the amplified signal is generated to overstate the first current and the current sense signal is generated without overstating the second current, wherein the plurality of power stage circuits comprises the first power stage circuit and the second power stage circuit, and wherein a maximum output current of the first power stage circuit is lower than a maximum output current of the second power stage circuit and a power conversion efficiency of the first power stage circuit is higher than a power conversion efficiency of the second power stage circuit.

* * * * *